US012743136B2

(12) United States Patent
Hsu et al.

(10) Patent No.: US 12,743,136 B2
(45) Date of Patent: Sep. 22, 2026

(54) HINGE

(71) Applicant: FOSITEK CORPORATION, New Taipei City (TW)

(72) Inventors: An-Szu Hsu, New Taipei City (TW); Yang-Zhong Wu, Shenzhen City (CN); An-Wei Chung, Kaohsiung City (TW)

(73) Assignee: FOSITEK CORPORATION, New Taipei City (TW)

(*) Notice: Subject to any disclaimer, the term of this patent is extended or adjusted under 35 U.S.C. 154(b) by 226 days.

(21) Appl. No.: 18/615,522

(22) Filed: Mar. 25, 2024

(65) Prior Publication Data

US 2025/0216910 A1 Jul. 3, 2025

(30) Foreign Application Priority Data

Dec. 28, 2023 (CN) ........................ 202311839381.8

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01)

(58) Field of Classification Search
CPC .... G06F 1/1652; G06F 1/1681; G06F 1/1616; H04M 1/0268
See application file for complete search history.

(56) References Cited

U.S. PATENT DOCUMENTS 9,874,906 B1* 1/2018 Hsu ........................ G06F 1/1681
11,408,214 B1* 8/2022 Hsu ........................ H04M 1/022
2021/0124090 A1* 4/2021 Kim ........................ G02B 1/14
2021/0195775 A1* 6/2021 Zhao .................. E05D 11/0054
2021/0271294 A1* 9/2021 Liao ........................ G06F 1/181
2021/0375167 A1* 12/2021 Lin ........................ G06F 1/1652
2022/0086265 A1* 3/2022 Shang .................. G06F 1/1652
2022/0217228 A1* 7/2022 Hu ........................ G06F 1/1652
2022/0247843 A1* 8/2022 Hu ........................ G06F 1/1681
2022/0303371 A1* 9/2022 Liao .................... H04M 1/0268
2023/0384839 A1* 11/2023 Cheng .................. G06F 1/1681
2024/0160252 A1* 5/2024 Hsu ........................ G06F 1/1681
2024/0384750 A1* 11/2024 Jiang ........................ F16C 11/04

* cited by examiner

*Primary Examiner* — Emily M Morgan
(74) *Attorney, Agent, or Firm* — Birch, Stewart, Kolasch & Birch, LLP

(57) ABSTRACT

A hinge includes a fixing seat, two rotating units, and two supporting plate units. The two supporting plate units are disposed respectively on the rotating units, and each of the supporting plate units has a main supporting plate having first and second ends respectively proximate to and distal from the fixing seat, an auxiliary supporting plate, and a plurality of resilient members. The rotating units are movable between an opened state, where a distance between the auxiliary supporting plates is smaller than a distance between the main supporting plates, and a closed state, where the supporting plate units face each other, a distance between the main supporting plates decreases from the first ends of the main supporting plates to the second ends of the main supporting plates, and for each supporting plate unit, each of the auxiliary supporting plates is pivoted to an angle relative to the main supporting plate.

6 Claims, 9 Drawing Sheets

HINGE

CROSS-REFERENCE TO RELATED APPLICATION

This application claims priority to Chinese Invention patent application No. 202311839381.8, filed on Dec. 28, 2023, the entire disclosure of which is incorporated by reference herein.

FIELD

The disclosure relates to a hinge, and more particularly to a hinge for connecting two case bodies and supporting a flexible display.

BACKGROUND

A conventional hinge is adapted for connecting two case bodies, allowing the two case bodies to be opened or folded closed, and supporting a flexible display. The conventional hinge includes a base seat, two rotating units connected to the base seat, and two supporting plates respectively connected to the rotating units and adapted to support the flexible display. The flexible display may not have sufficient support and may have an increased chance of creasing if a distance between the two supporting plates is too wide; however, as the distance between the two supporting plates is shortened, the supporting plates may abut against or clamp onto the flexible display when folded closed, which damages the flexible display. Hence, there is room for improvement.

SUMMARY

Therefore, an object of the disclosure is to provide a hinge that can alleviate at least one of the drawbacks of the prior art.

According to the disclosure, the hinge is adapted to be connected to two housing bodies. The hinge includes a fixing seat, two rotating units, and two supporting plate units. The fixing seat has two lengthwise side parts and two first slots. The two lengthwise side parts have a central axis disposed therebetween. The two first slots are respectively disposed at opposite sides of the central axis, and each of the first slots is curved. The two rotating units are respectively disposed at the opposite sides of the central axis, are connected to the fixing seat, and respectively engage the first slots. Each of the rotating units includes a linkage member, a rail slider, and a rotating arm. The linkage member has a main body, a first curved rail and a second curved rail. The main body has a load surface. The first curved rail is connected to the main body and slidably engages the respective one of the first slots. The second curved rail is connected to the main body and extends away from the main body. The rail slider is adapted to be connected to a respective one of the housing bodies, and has a slider body, a second slot, and an inclined sliding portion. The slider body has a supporting surface that is adapted to be connected to the respective one of the housing bodies. The second slot is formed in the slider body, has a curved shape, and is slidably engaged with the second curved rail. The inclined sliding portion is formed on the slider body. The rotating arm is pivotably mounted to the fixing seat, and has an arm body and an inclined guiding portion formed on the arm body. The inclined sliding portion of the rail slider and the inclined guiding portion of the rotating arm slidably engage each other. The two supporting plate units are disposed respectively on the rotating units.

Each of the supporting plate units has a main supporting plate, an auxiliary supporting plate and a plurality of resilient members. The main supporting plate is mounted co-movably to the load surface of the linkage member of the respective one of the rotating units, and has opposite first and second ends that are respectively proximate to and distal from the fixing seat. The auxiliary supporting plate is pivotably mounted to the main supporting plate. The plurality of resilient members are connected between the main supporting plate and the auxiliary supporting plate. The rotating units are movable between an opened state and a closed state. When the rotating units are in the opened state, the supporting plate units cooperatively cover the fixing seat, and a distance between the auxiliary supporting plates of the supporting plate units is smaller than a distance between the main supporting plates of the supporting plate units. When the rotating units are in the closed state, the supporting plate units face each other, a distance between the main supporting plates of the supporting plate units decreases from the first ends of the main supporting plates of the supporting plate units to the second ends of the main supporting plates of the supporting plate units, the auxiliary supporting plate of each of the supporting plate units is pivoted to an angle relative to the main supporting plate of the supporting plate unit, and abuts against the fixing seat, and the supporting surfaces of the rail sliders are parallel to each other.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 2 is a partly exploded perspective view of the embodiment.

DETAILED DESCRIPTION

Figure 1:
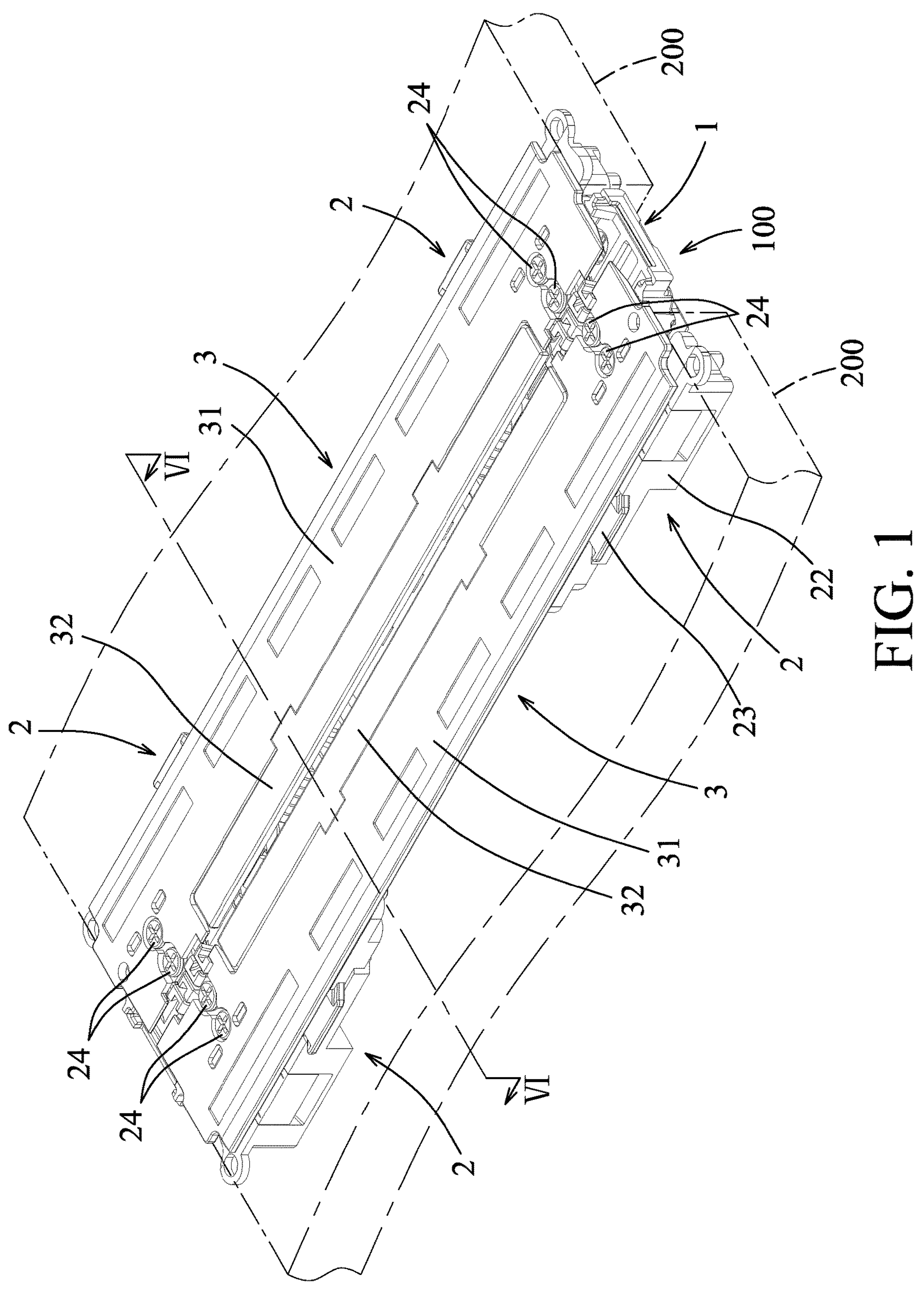
FIG. 1 is a perspective view illustrating an embodiment of a hinge according to the disclosure, which illustrates two rotating units in an opened state.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly”

and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 6:
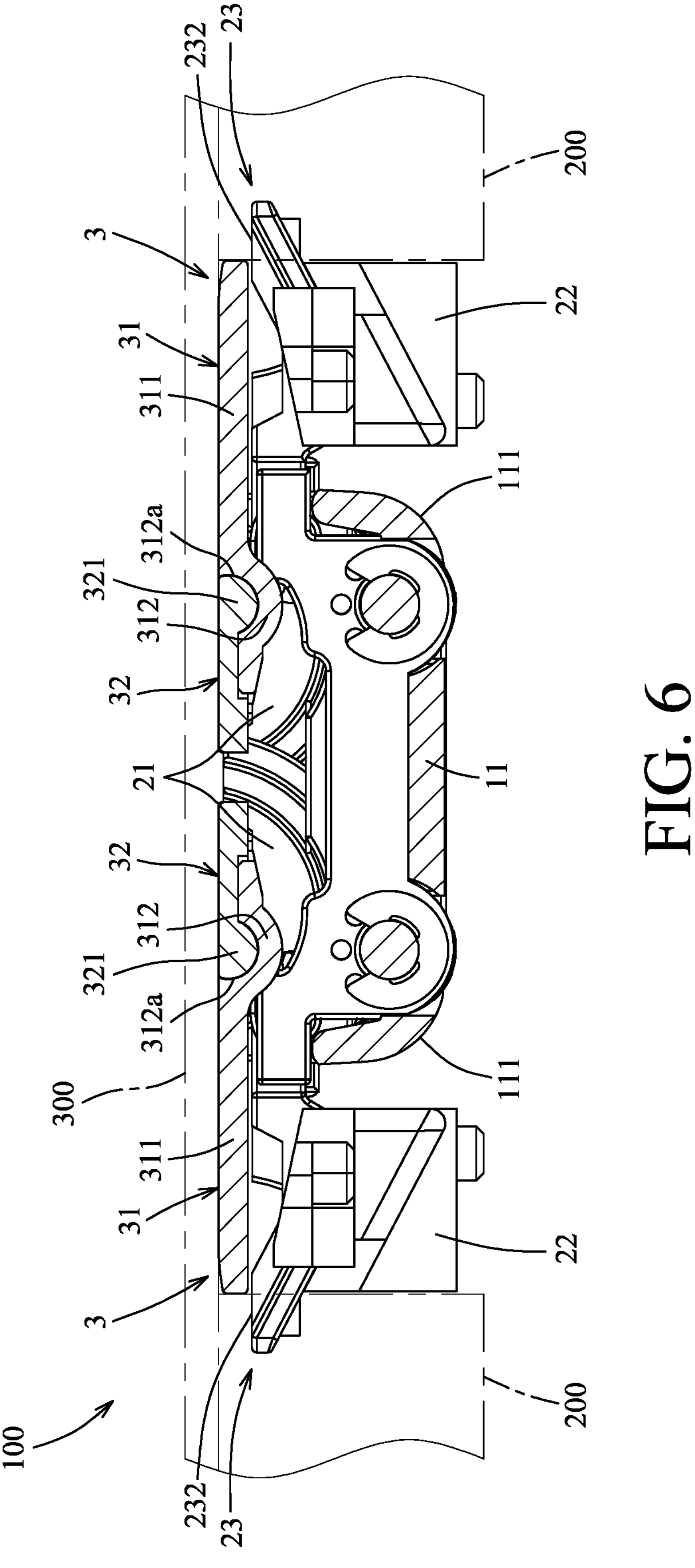
FIG. 6 is a sectional view of the embodiment taken along line VI-VI in FIG. 1.

Referring to FIGS. 1 to 4, an embodiment of a hinge 100 according to the disclosure is adapted to be connected to two housing bodies 200 and support a flexible display 300 (see FIG. 6). The hinge 100 includes a fixing seat 1, four rotating units 2, two supporting plate units 3, and two synchronizing mechanisms 4.

The fixing seat 1 has a fixing frame 11, a fixing seat housing (not shown) connected to the fixing frame 11, and two rail frames 12 connected to the fixing frame 11 and opposite to the fixing seat housing. The fixing frame 11 has two lengthwise side parts 111 that have a central axis (C) disposed therebetween. The central axis (C) is parallel to and in the middle between the lengthwise side parts 111. The rail frames 12 are spaced apart from each other along the central axis (C), and each of the rail frames 12 has two first slots 121 that are respectively disposed at opposite sides of the central axis (C). Each of the first slots 121 is curved.

The rotating units 2 come in pairs, and this embodiment includes two pairs of rotating units 2 respectively mounted to the rail frames 12. For each pair of the rotating units 2 and the two first slots 121 of the respective one of the rail frames 12, the rotating units 2 are respectively disposed at the opposite sides of the central axis (C), are respectively connected to the rail frames 12 of the fixing seat 1, and respectively engage the first slots 121. Since one of the two pairs of the rotating units 2 and the other one of the two pairs of the rotating units 2 are symmetrical, and since the rail frames 12 are symmetrical, only one pair of the rotating units 2 and the respective one of the rail frames 12 will be described in the following for the sake of brevity. The rotating units 2 are adapted to be respectively connected to the housing bodies 200. The rotating units 2 are movable between an opened state (see FIG. 1) and a closed state (see FIG. 7). Each of the rotating units 2 includes a linkage member 21, a rail slider 22, a rotating arm 23, and a plurality of connecting members 24.

Figure 3:
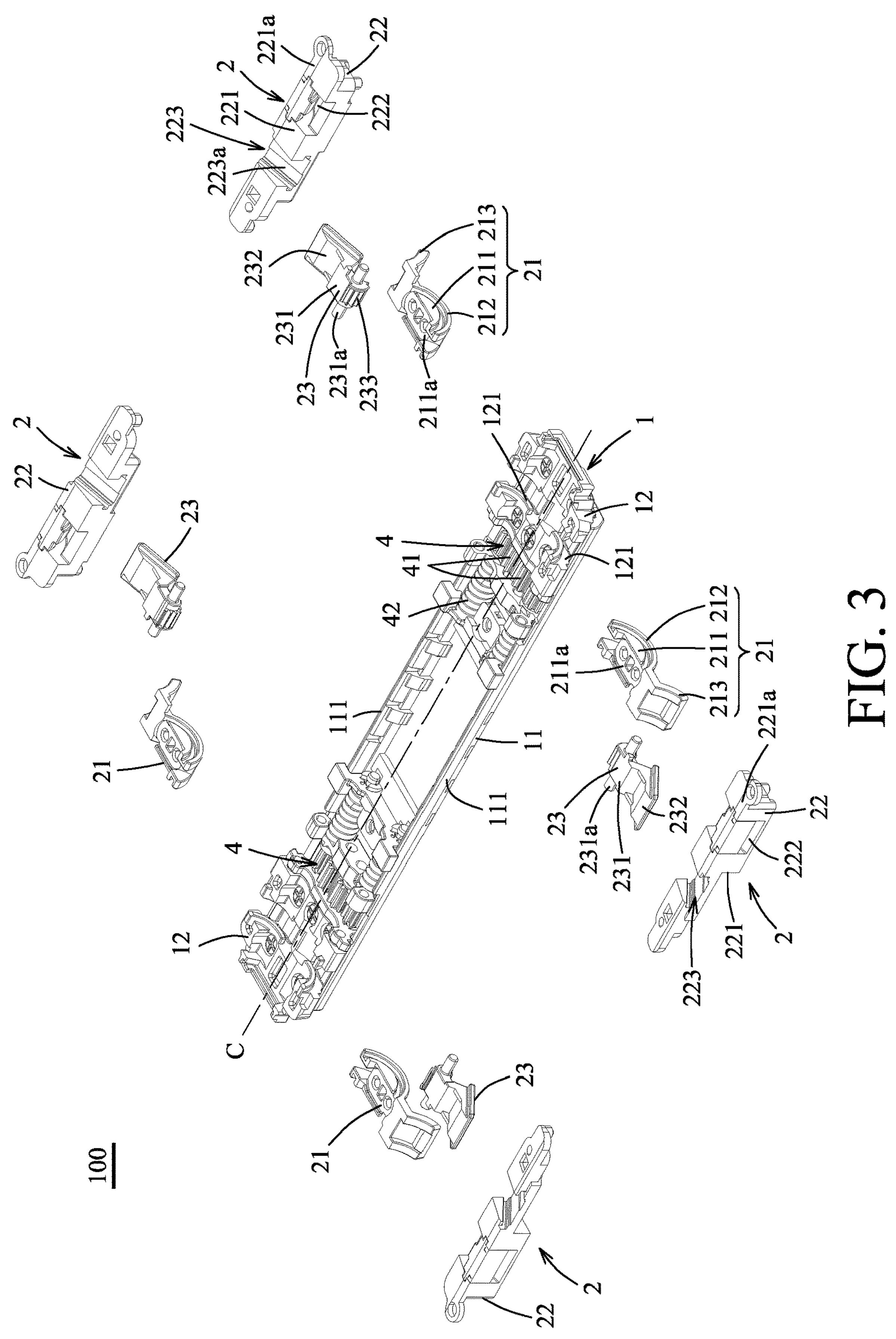
FIG. 3 is a fragmentary partly exploded perspective view of the embodiment.
Figure 4:
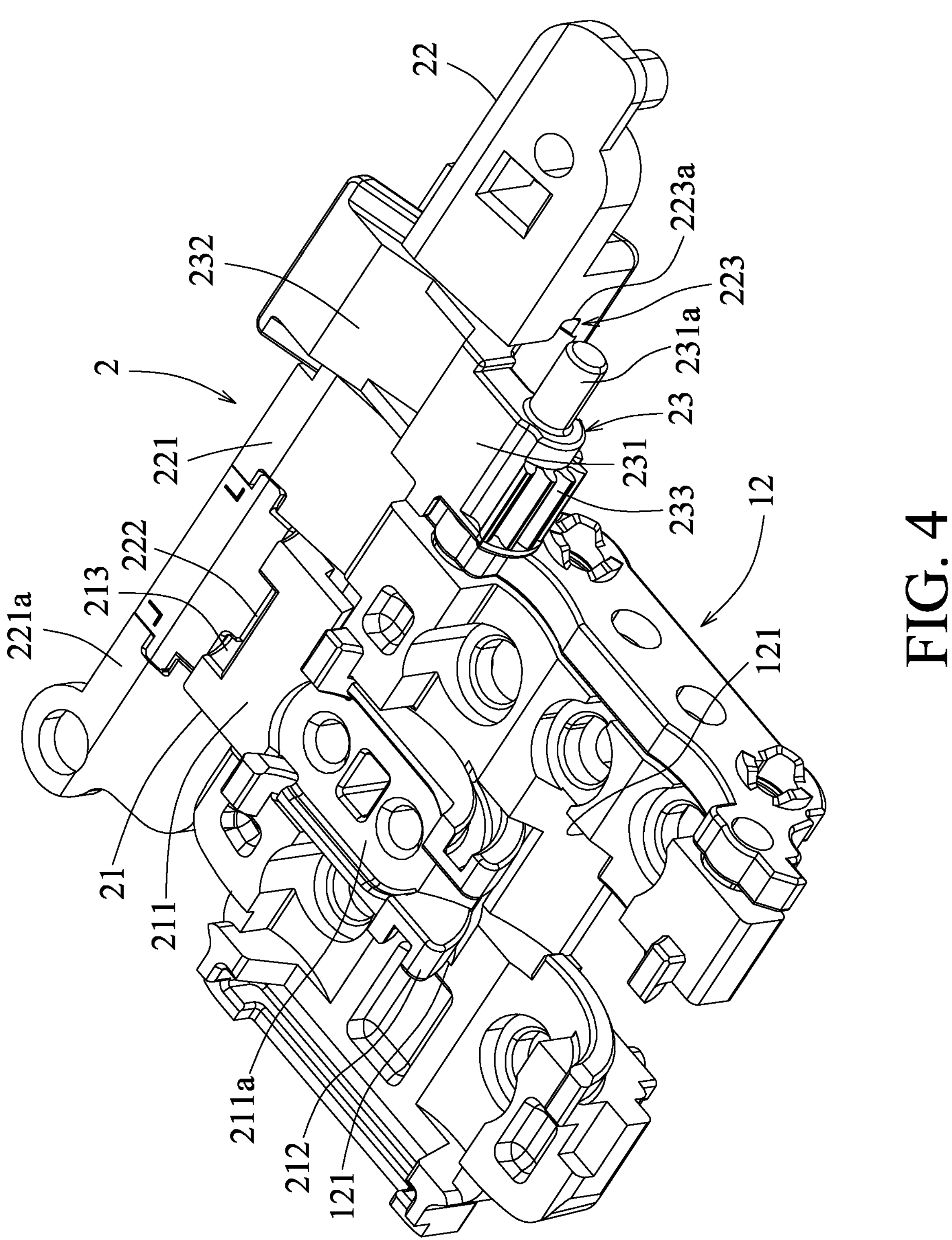
FIG. 4 is a perspective view of a rail frame and one of the rotating units when the rotating units are in the opened state.
Figure 5:
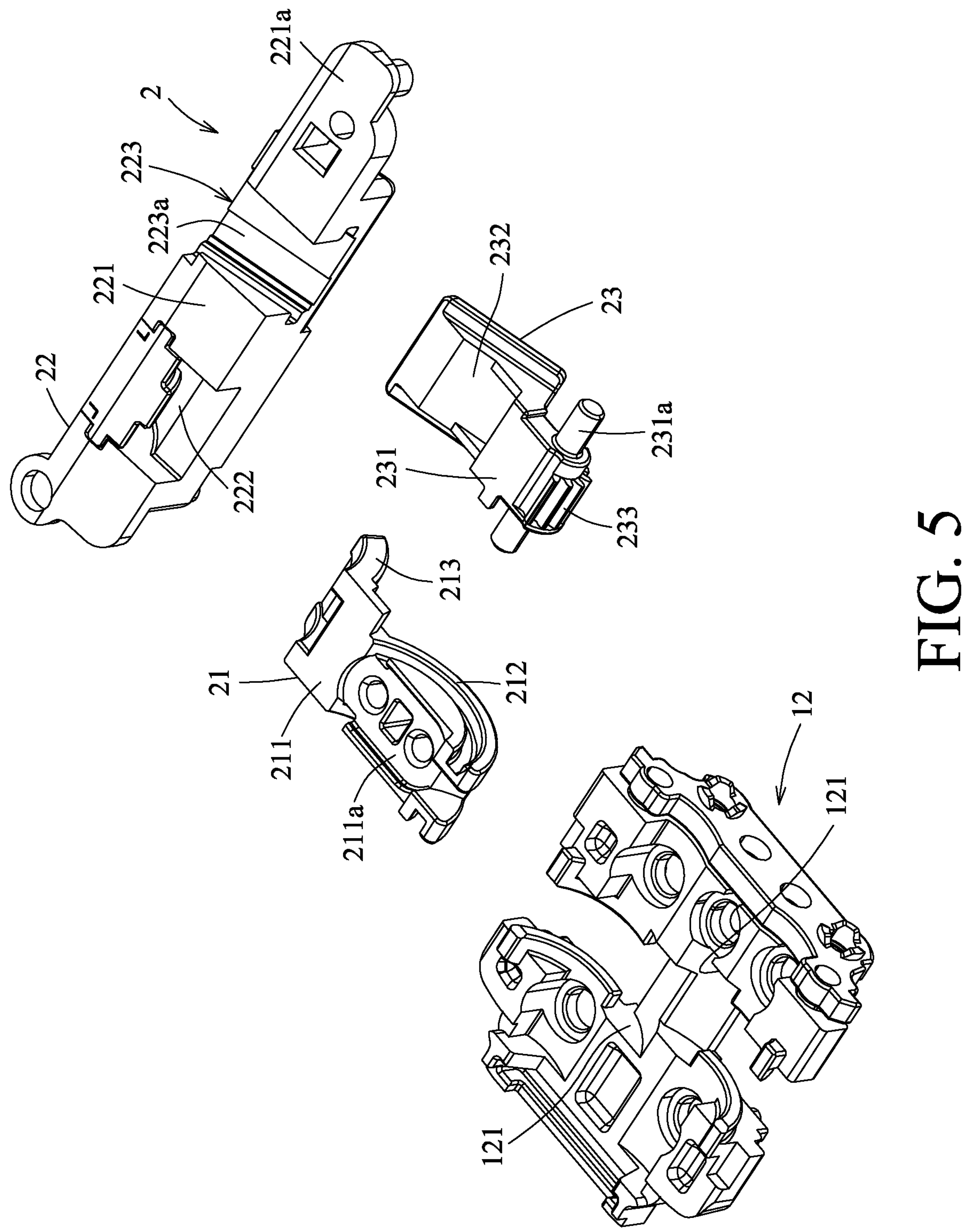
FIG. 5 is an exploded perspective view of FIG. 4.

Referring to FIGS. 3 to 5, the linkage member 21 has a main body 211 that has a load surface 211*a*, a first curved rail 212 that is connected to the main body 211 and that slidably engages the respective one of the first slots 121, and a second curved rail 213 that is connected to the main body 211 and that extends away from the main body 211.

The rail slider 22 is adapted to be connected to a respective one of the housing bodies 200, and has a slider body 221, a second slot 222, and an inclined sliding portion 223. The slider body 221 has a supporting surface 221*a* that is adapted to be connected to the respective one of the housing bodies 200. The second slot 222 is formed in the slider body 221, has a curved shape, and is slidably engaged with the second curved rail 213. The inclined sliding portion 223 is formed on the slider body 221, and has an inclined sliding rail 223*a* that is a groove and that is inclined relative to the supporting surface 221*a*.

The rotating arm 23 is pivotably mounted to the fixing seat 1, and has an arm body 231, an inclined guiding portion 232 formed on the arm body 231, and a gear portion 233 formed on the arm body 231. The arm body 231 has a pivoting shaft 231*a* that is pivotably mounted on the respective one of the rail frames 12, so that the rotating arm 23 may pivot with the pivoting shaft 231*a* as a pivot point. For each of the rotating units 2, the inclined guiding portion 232 of the rotating arm 23 and the inclined sliding portion 223 of the rail slider 22 slidably engage each other.

Figure 2:
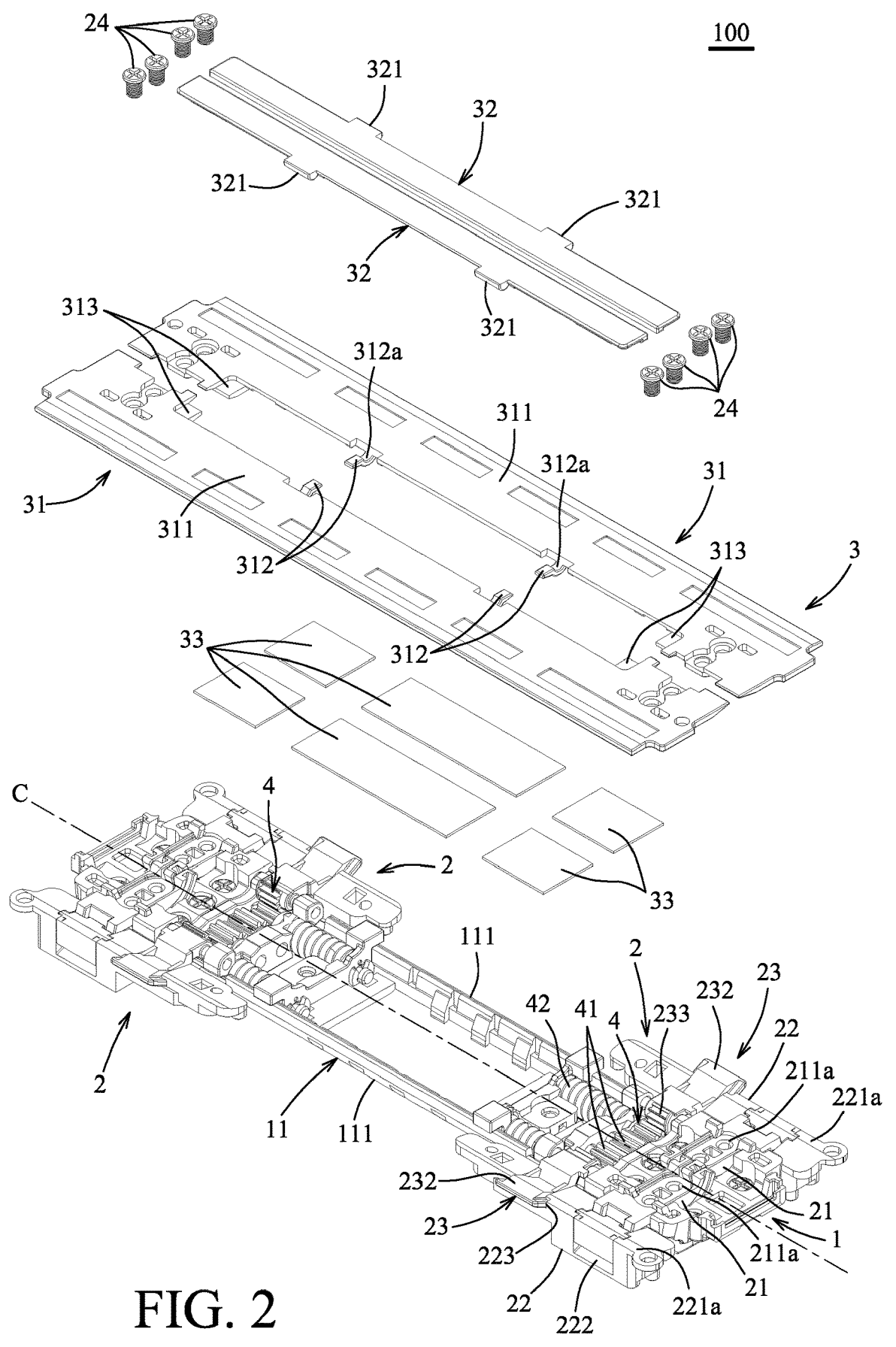

Referring to FIGS. 1 and 2, the supporting plate units 3 are disposed respectively on the rotating units 2, and each of the supporting plate units 3 has a main supporting plate 31, an auxiliary supporting plate 32 that is pivotably mounted to the main supporting plate 31, and a plurality of resilient members 33. For each of the supporting plate units 3, each of the resilient members 33 has a portion connected to the main support member 31, and another portion connected to the auxiliary support member 32. The main supporting plate 31 of each of the supporting plate units 3 is mounted co-movably to the load surface 211*a* of the linkage member 21 of the respective one of the rotating units 2, and has a plate body portion 311, a plurality of pivoting joint portions 312 that extend from the plate body portion 311 towards the central axis (C), and two protruding portions 313 that extend from the plate body portion 311 and that respectively support opposite ends of the auxiliary supporting plate 32. Specifically, the main supporting plate 31 has opposite first and second ends that are respectively proximate to and distal from the fixing seat 1, and the pivoting joint portion 312 and the protruding portions 313 are disposed at the first end of the main supporting plate 31. In this embodiment, a number of pivoting joint portions 312 is two, but it may be changed as needed in other embodiments. Each of the pivoting joint portions 312 defines a pivoting joint groove 3 12*a*. For each of the supporting plate units 3, the auxiliary supporting plate 32 has a plurality of pivoting blocks 321 pivotably and respectively mounted to the pivoting joint portions 312 of the main supporting plate 31. In this embodiment, each of the auxiliary supporting plates 32 has two pivoting blocks 321. Specifically, for each of the supporting plate units 3, each of the pivoting blocks 321 of the auxiliary supporting plate 32 is pivotally disposed in the pivoting joint groove 312*a* of the respective one of the pivoting joint portions 312 of the main supporting plate 31. Specifically, each of the resilient members 33 is a gel sheet. The connecting members 24 of the rotating units 2 secure the main supporting plates 31 of the supporting plate units 3 to the load surfaces 211*a* of the linkage members 21 of the rotating units 2. The connecting members 24 may be, for example, rivets.

Referring to FIGS. 1, 2 and 6, when the rotating units 2 are in the opened state, the main supporting plates 31 and the auxiliary supporting plates 32 of the supporting plate units 3 cooperatively cover the fixing seat 1, and a distance between the auxiliary supporting plates 32 of the supporting plate units 3 is smaller than a distance between the main supporting plates 31 of the supporting plate units 3. Furthermore, the supporting surfaces 221*a* of the rail sliders 22 are co-planar to the load surfaces 211*a* of the linkage members 21, so that the housing bodies 200 connected to the supporting surfaces 221*a* of the rail sliders 22, the main supporting plates 31 connected to the load surfaces 211*a* of the linkage members 21, and the auxiliary supporting plates 32 are co-planar and levelly support the flexible display 300. By virtue of the distance between the auxiliary supporting plates 32 being smaller than the distance between the main supporting plates 31, a gap between the supporting plate units 3 is decreased, thereby increasing support from the main supporting plates 31 and the auxiliary supporting plates 32 to the flexible display 300. The configuration of the auxiliary supporting plates 32 respectively abutting against the pivot joint portions 312 prevents the auxiliary supporting plates 32 from pivoting towards the fixing seat 1 when a user presses against the flexible display 300.

Figure 7:
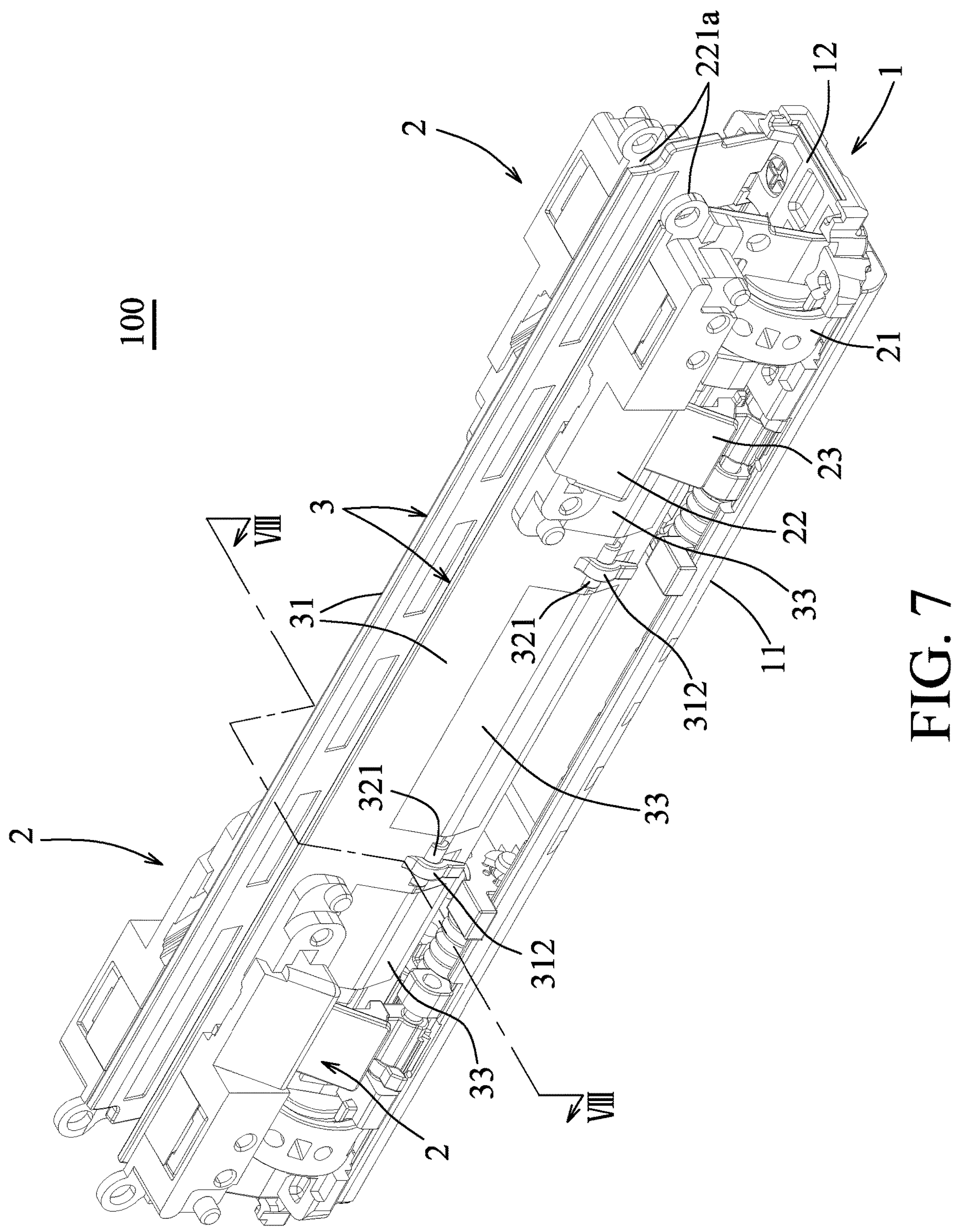
FIG. 7 is a perspective view of the embodiment, illustrating the rotating units in a closed state.
Figure 8:
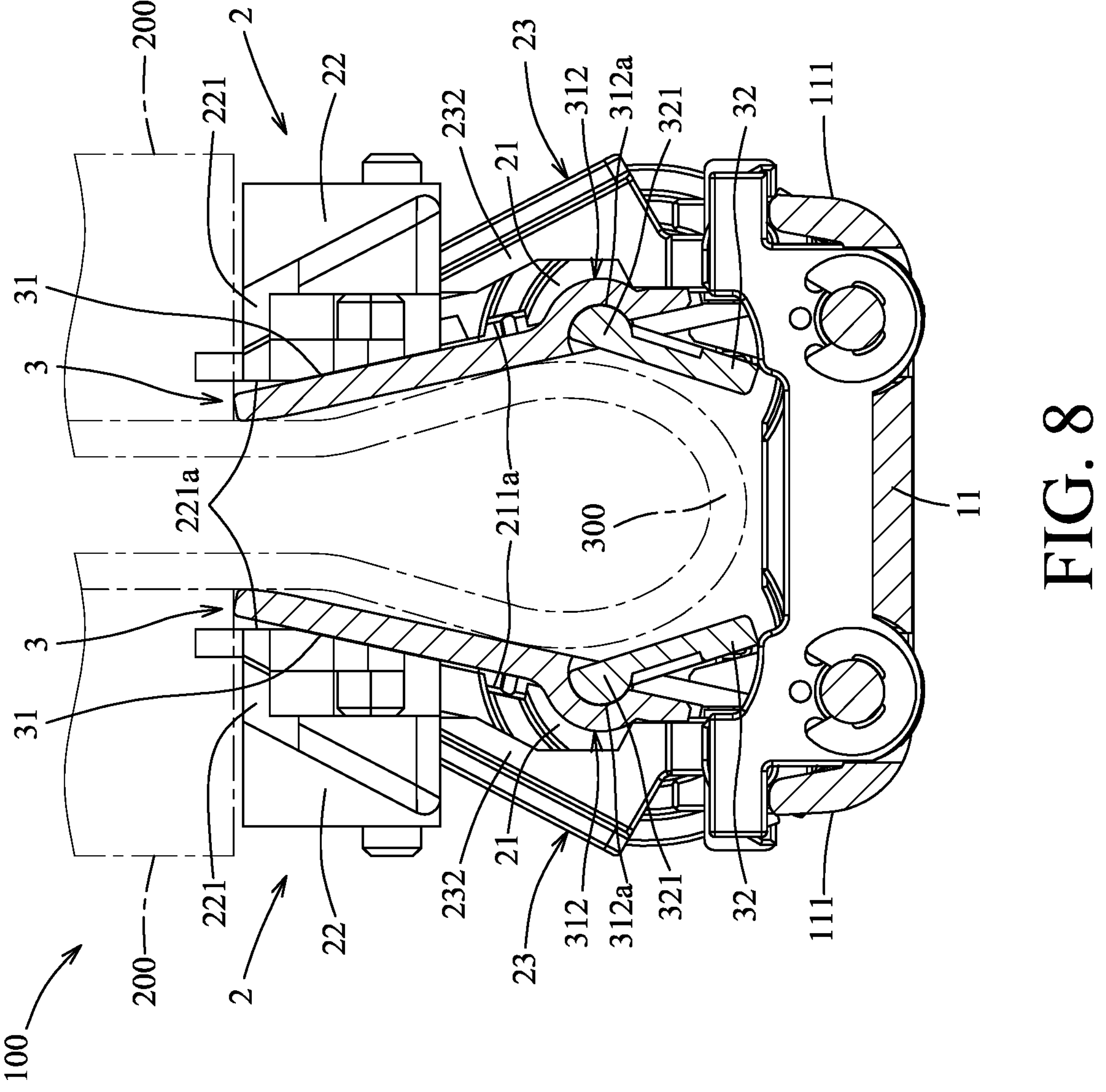
FIG. 8 is a sectional view of the embodiment taken along line VIII-VIII in FIG. 7.
Figure 9:
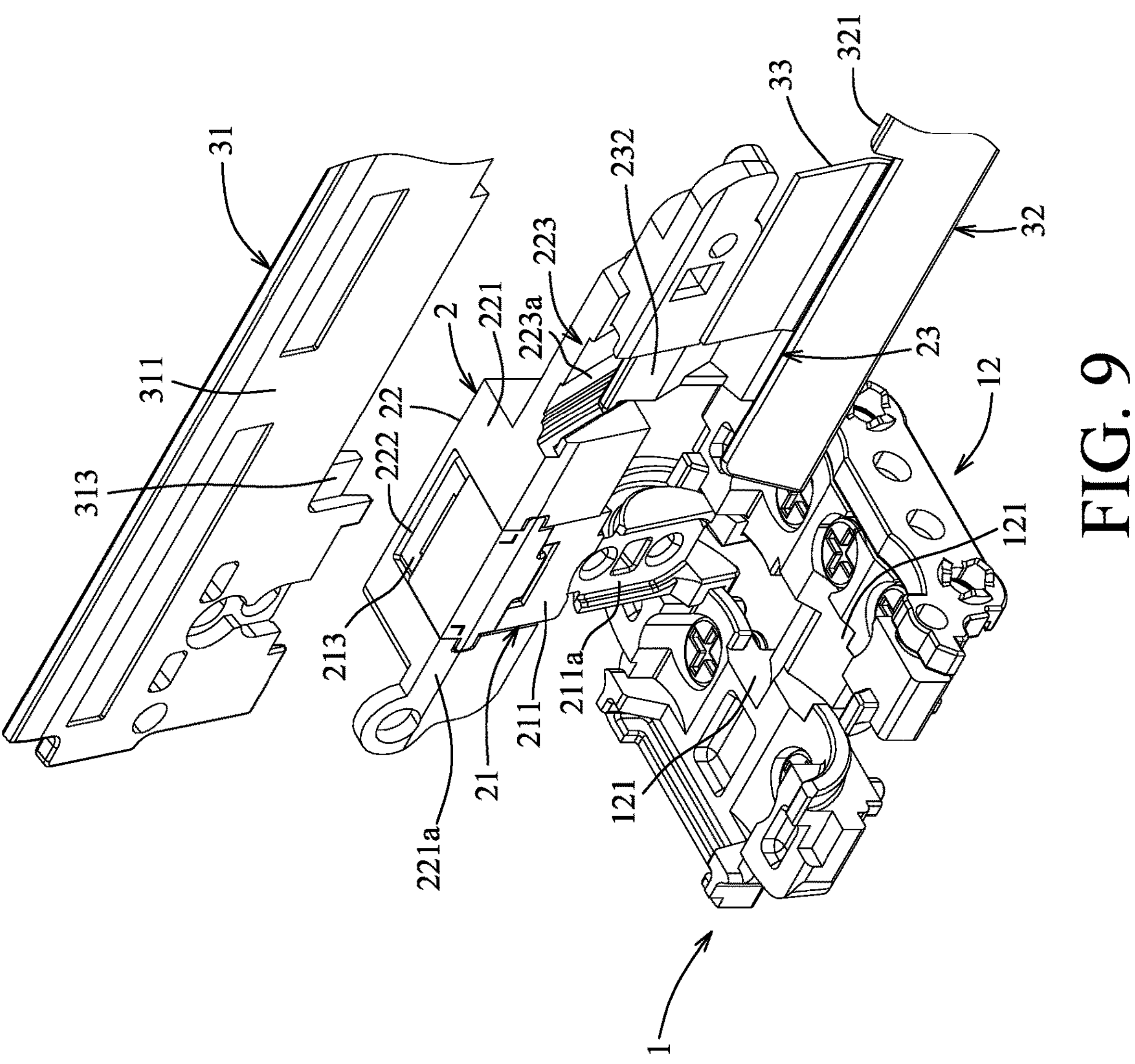
FIG. 9 is a partially exploded fragmentary perspective view of the rail frame, illustrating one of the rotating units and a supporting plate unit when the rotating units are in the closed state.

Referring to FIGS. 7 to 9, when the rotating units 2 are in the closed state, the main supporting plates 31 of the supporting plate units 3 face each other, a distance between the main supporting plates 31 of the supporting plate units 3 decreases from the first ends of the main supporting plates 31 to the second ends of the main supporting plates 31 of the supporting plate units 3, and the auxiliary supporting plate 32 of each of the supporting plate units 3 is pivoted to an angle relative to the main supporting plate 31 of the supporting plate unit 3 and abuts against the fixing seat 1, forming an accommodating space that is adapted to accommodate the flexible display 300, and allowing a screen crease of the flexible display 300, e.g., being folded into a waterdrop shape (see FIG. 8), to prevent excessive bending. Moreover, the configuration of the auxiliary supporting plates 32 prevents the flexible display 300 from being damaged via abutting against the fixing seat 1 and/or being clamped by the main supporting plates 31. The supporting surfaces 221*a* of the rail sliders 22 are parallel to each other, and for each of the supporting plate units 3, the main supporting plate 31 and the respective one of the linkage members 21 are co-movable, and the main supporting plate 31 is parallel to the load surface 211*a* of the respective one of the linkage members 21.

Specifically, when the rotating units 2 are moved from the opened state to the closed state, for each of the rotating units 2, the first curved rail 212 slides along the respective one of the first slots 121. Each of the load surfaces 211*a* has proximate and distal ends that are respectively proximate to and distal from the fixing seat 1. When the rotating units 2 are in the closed state, a distance between the load surfaces 211*a* of the linkage members 21 decreases from the proximate ends of the load surfaces 211*a* to the distal ends of the load surfaces 211*a*, and by virtue of each main supporting plate 31 being parallel to the load surface 211*a* of the respective one of the linkage members 21, the distance between the main supporting plates 31 of the supporting plate units 3 decreases from the first ends of the main supporting plates 31 to the second ends of the main supporting plates 31 of the supporting plate units 3.

Referring to FIGS. 3, 8, and 9, when the rotating units 2 are moved from the opened state to the closed state, for each of the rotating units 2, the second slot 222 of the rail slider 22 slides along the second curved rail 213, and the inclined sliding portion 223 slides against the inclined guiding portion 232 of the rotating arm 23, so that the supporting surfaces 221*a* of the rail sliders 22 of the rotating units 2 parallelly face each other, the housing bodies 200 are parallel to each other, and the resilient members 33 store a resilient force. When the rotating units 2 are moved from the closed state to the opened state, for each of the supporting plate units 3, the main supporting plate 31 and the auxiliary supporting plate 32 are driven by the resilient force of the resilient members 33 to unfold, so that the main supporting plate 31 and the auxiliary supporting plate 32 are co-planar.

Referring further to FIGS. 2 and 3, the two synchronizing mechanisms 4 are respectively mounted to the rail frames 12 of the fixing seat 1 and the two pairs of the rotating units 2. Each of the synchronizing mechanisms 4 interconnects the rotating arms 23 of the respective pair of the rotating units 2, and includes a plurality of gears 41 and a torque unit 42. In this embodiment, the plurality of gears 41 includes two gears 41 (in other embodiments, a number of the gears 41 may be another even number), and mesh with the gear portions 233 of the rotating arms 23 of the respective pair of the rotating units 2 and the torque unit 42. The synchronizing mechanisms 4 provides a torque and drives the rotating units 2 to simultaneously rotate.

In conclusion, when the rotating units 2 of the hinge 100 are in the closed state, the auxiliary supporting plate 32 of each of the supporting plate units 3 is pivoted to the angle relative to the main supporting plate 31 of the supporting plate unit 3, and the main supporting plates 31 and the auxiliary supporting plates 32 of the supporting plate units 3 form the accommodating space that is adapted to accommodate the flexible display 300, preventing the flexible display 300 from abutting against the fixing seat 1. When the rotating units 2 are moved to the opened state, the resilient force of the resilient members 33 drives the main supporting plate 31 and the auxiliary supporting plate 32 of each of the supporting plate units 3 to unfold, such that the main supporting plate 31 is co-planar with the auxiliary supporting plate 32. Hence, an objective of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A hinge adapted to be connected to two housing bodies, said hinge comprising:

a fixing seat that has two first slots respectively disposed at opposite sides of the central axis, each of said first slots being curved;

two rotating units that are respectively disposed at the opposite sides of the central axis, that are connected to said fixing seat, and that respectively engage said first slots, each of said rotating units including a linkage member that has a main body having a load surface, a first curved rail connected to said main body and slidably engaging the respective one of said first slots, and a second curved rail connected to said main body and extending away from said main body, and a rail slider that is adapted to be connected to a respective one of the housing bodies, and that has a slider body having a supporting surface that is adapted to be connected to the respective one of the housing bodies, a second slot formed in said slider body, having a curved shape, and slidably engaged with said second curved rail, and an inclined sliding portion formed on said slider body, and a rotating arm that is pivotably mounted to said fixing seat, and that has an arm body, and an inclined guiding portion formed on said arm body, said inclined sliding portion of said rail slider and said inclined guiding portion of said rotating arm slidably engaging each other; and two supporting plate units that are disposed respectively on said rotating units, each of said supporting plate units having a main supporting plate that is mounted co-movably to said load surface of said linkage member of the respective one of said rotating units, and that has opposite first and second ends being respectively proximate to and distal from said fixing seat, an auxiliary supporting plate that is pivotably mounted to said main supporting plate, and a plurality of resilient members, each of said resilient members having a portion that is connected to said main support member, and another portion that is connected to said auxiliary support member;

wherein said rotating units are movable between an opened state and a closed state;

wherein, when said rotating units are in the opened state, said supporting plate units cooperatively cover said fixing seat, and a distance between said auxiliary supporting plates of said supporting plate units is smaller than a distance between said main supporting plates of said supporting plate units; and wherein, when said rotating units are in the closed state, said supporting plate units face each other, a distance between said main supporting plates of said supporting plate units decreases from said first ends of said main supporting plates of said supporting plate units to said second ends of said main supporting plates of said supporting plate units, said auxiliary supporting plate of each of said supporting plate units is pivoted to an angle relative to said main supporting plate of said supporting plate unit, and abuts against said fixing seat, and said supporting surfaces of said rail sliders are parallel to each other.

2. The hinge as claimed in claim 1, wherein:

said main supporting plate of each of said supporting plate units has a plate body portion, and a plurality of pivoting joint portions extending from said plate body portion towards the central axis; and said auxiliary supporting plate of each of said supporting plate units has a plurality of pivoting blocks pivotably and respectively mounted to said pivoting joint portions of said supporting plate unit.

3. The hinge as claimed in claim 2, wherein, for each of said supporting plate units, each of said pivoting joint portions of said main supporting plate defines a pivoting joint groove, and each of said pivoting blocks of said auxiliary supporting plate is pivotably disposed in said pivoting joint groove of the respective one of said pivoting joint portions of said main supporting plate.

4. The hinge as claimed in claim 2, wherein, for each of said supporting plate units, said main supporting plate further has two protruding portions extending from said plate body portion and respectively supporting opposite ends of said auxiliary supporting plate.

5. The hinge as claimed in claim 1, wherein each of said resilient members is a gel sheet.

6. The hinge as claimed in claim 1, wherein:

said rotating arm of each of said rotating units further has a gear portion formed on said arm body; and said hinge further comprises a synchronizing mechanism interconnecting said rotating arms of said rotating units and including a plurality of gears that mesh with said gear portions of said rotating arms of said rotating units.

* * * * *